US011558257B1

United States Patent
Iyer et al.

(10) Patent No.: US 11,558,257 B1
(45) Date of Patent: Jan. 17, 2023

(54) MANAGING SESSION MESHES (71) Applicant: Dell Products L.P., Round Rock, TX (US)

(72) Inventors: Vivek Viswanathan Iyer, Austin, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/404,081

(22) Filed: Aug. 17, 2021

(51) Int. Cl.
*H04L 41/0893* (2022.01)
*H04L 41/0816* (2022.01)
*H04L 67/141* (2022.01)
*H04L 41/0806* (2022.01)

(52) U.S. Cl.
CPC ...... *H04L 41/0893* (2013.01); *H04L 41/0806* (2013.01); *H04L 41/0816* (2013.01); *H04L 67/141* (2013.01)

(58) Field of Classification Search
None
See application file for complete search history.

(56) References Cited

U.S. PATENT DOCUMENTS

| | | | | |
|---|---|---|---|---|
| 9,361,432 B2 * | 6/2016 | Deter | | H04L 63/20 |
| 11,150,860 B1 * | 10/2021 | Bull | | G06F 3/1454 |
| 2011/0165858 A1 * | 7/2011 | Gisby | | H04W 48/04 |
| | | | | 455/411 |
| 2011/0225247 A1 * | 9/2011 | Anantharaman | | H04L 65/752 |
| | | | | 709/224 |
| 2018/0268126 A1 * | 9/2018 | Kaushik | | G06F 21/57 |
| 2021/0014676 A1 * | 1/2021 | Silverstein | | H04W 4/029 |
| 2021/0133689 A1 * | 5/2021 | Bedekar | | G06V 20/41 |
| 2021/0211317 A1 * | 7/2021 | Khan | | H04N 7/155 |
| 2021/0409547 A1 * | 12/2021 | Channapragada | | H04M 3/567 |
| 2022/0004623 A1 * | 1/2022 | Trabelsi | | G06F 9/45558 |
| 2022/0239698 A1 * | 7/2022 | Anantharaju | | G06N 20/00 |

* cited by examiner

*Primary Examiner* — Scott B Christensen
(74) *Attorney, Agent, or Firm* — Kirton McConkie; Brian Tucker (57) ABSTRACT

Session meshes can be managed. When a session is to be initiated, session mesh devices can be detected and identified. Based on the session mesh devices that are part of a session mesh, a session mesh policy can be created to define configurations for the session mesh devices that will ensure that the session mesh complies with applicable security requirements. The session mesh policy can be distributed to one or more client computing devices in the session mesh which can apply the configurations to the session mesh devices. In conjunction with applying the configurations to the session mesh devices, the client computing devices can provide confirmation that the session mesh has been configured in accordance with the session mesh policy. The session can then be initiated.

20 Claims, 11 Drawing Sheets

MANAGING SESSION MESHES

CROSS-REFERENCE TO RELATED APPLICATIONS

N/A

BACKGROUND

A user may oftentimes use his or her client computing device in a workspace. In this context, a workspace can be viewed as an environment that includes a client computing device and one or more devices to which the client computing device may be connected. Workspaces may commonly be used in a commercial/business environment such as in a meeting room or office.

Figure 1:
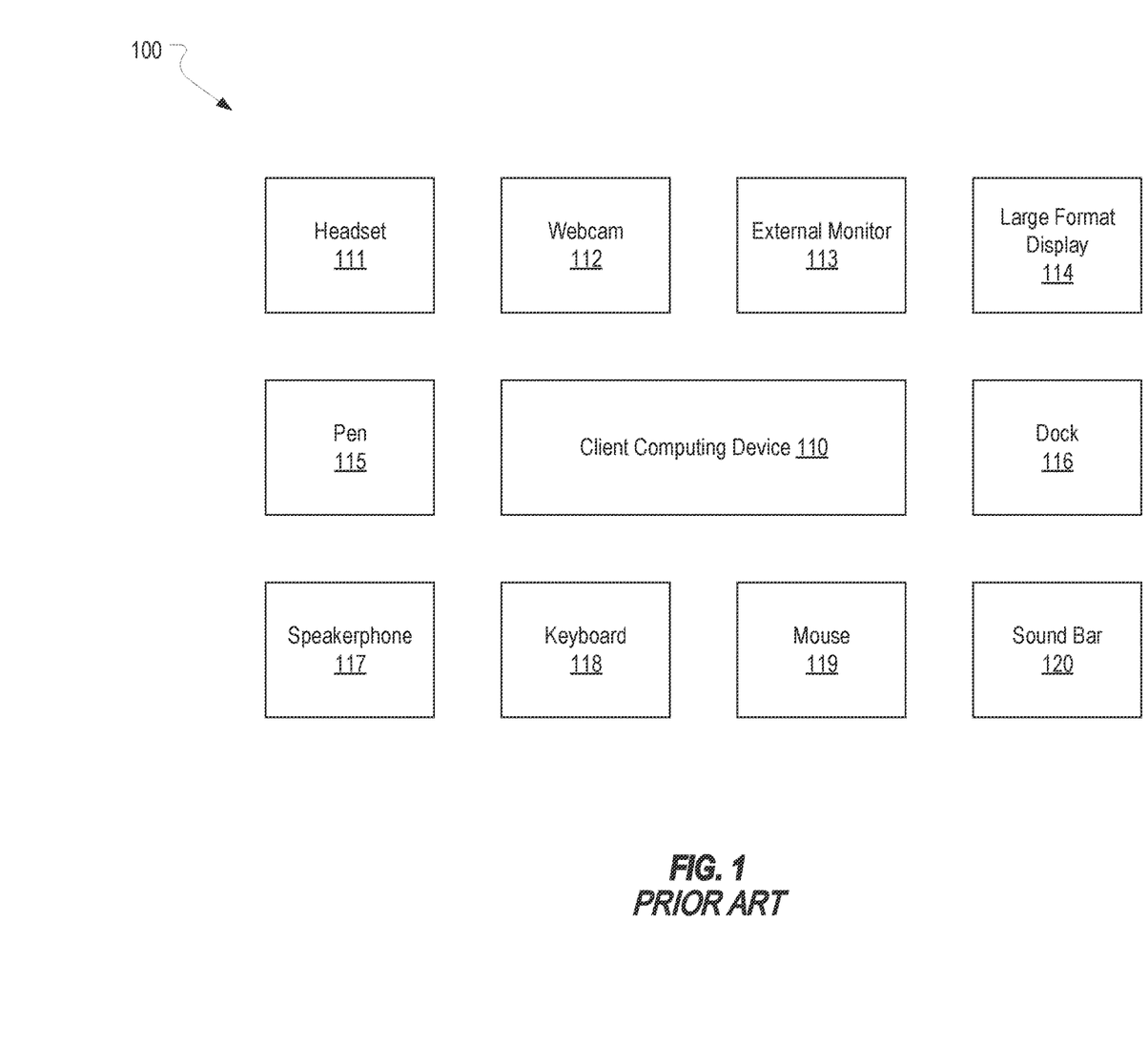
FIG. 1 provides an example of a workspace.

FIG. 1 provides an example of a workspace 100. As shown, workspace 100 includes client computing device 110 and various devices including a headset 111, a webcam 112, an external monitor 113, a large format display 114, a pen 115, a dock 116, a speakerphone 117, a keyboard 118, a mouse 119 and a sound bar 120, among possibly other devices. Client computing device 110 could be connected to these devices in any available way.

Each device in workspace 100 could provide a variety of functionality that client computing device 110 can leverage. For example, headset 111, webcam 112, external monitor 113, large format display 114, speakerphone 117, keyboard 118 and sound bar 120 could all include a microphone in addition to client computing device 100's internal microphone. As another example, webcam 112, external monitor 113 and large format display 114 could include a camera in addition to client computing device 100's internal camera. As a further example, headset 111, external monitor 113, large format display 114, speakerphone 117, keyboard 118 and sound bar 120 could each include a speaker in addition to client computing device 100's internal speaker.

Workspace 100 allows the user to customize his or her experience for any given scenario, such as by selecting which devices will handle input and/or output of audio and/or video. At the same time, however, the variety and customizability of functionality in workspace 100 makes it difficult to enforce security requirements in some scenarios. For example, if the user starts a meeting or other "session" using client computing device 110 and a security policy dictates that no cameras should be used during the meeting, it may not be possible to ensure that all cameras of the devices are disabled using a scalable technique. To the contrary, the user would likely need to manually disable each camera.

The difficulties of enforcing security requirements in a workspace environment are enhanced when additional client computing devices are present or participate in a session. Using the same example as above, if another user with a second client computing device enters the room during the meeting, it may be necessary to modify the available functionality within workspace 100 such as to disable any displays if the user of the second client computing device is not authorized to view any content displayed during the meeting. Yet, there may be no way to accomplish this using a scalable technique. Again, the user would likely need to manually disable each display.

BRIEF SUMMARY

The present invention extends to systems, methods and computer program products for managing session meshes. When a session is to be initiated, session mesh devices can be detected and identified. Based on the session mesh devices that are part of a session mesh, a session mesh policy can be created to define configurations for the session mesh devices that will ensure that the session mesh complies with applicable security requirements. The session mesh policy can be distributed to one or more client computing devices in the session mesh which can apply the configurations to the session mesh devices. In conjunction with applying the configurations to the session mesh devices, the client computing devices can provide confirmation that the session mesh has been configured in accordance with the session mesh policy. The session can then be initiated.

In some embodiments, the present invention may be implemented as a method for managing a session mesh. It can be detected that a session is to be initiated. Session mesh devices of a session mesh can be identified. A session mesh policy that defines configurations for the session mesh devices can be generated. The configurations defined in the session mesh policy can be applied to the session mesh devices to thereby cause the session mesh to comply with one or more requirements during the session.

In some embodiments, the present invention may be implemented as a method for managing a session mesh. Before, during or after a session, a first client computing device can identify a first set of session mesh devices of a session mesh. The first set of session mesh devices includes a second client computing device. The first client computing device can send a first session mesh report that identifies the first set of session mesh devices to a management service. The first client computing device can send a session mesh identification request to the second client computing device. In response to the session mesh identification request, the second client computing can identify a second set of session mesh devices of the session mesh. The second client computing device can send a second session mesh report that identifies the second set of session mesh devices to the management service. The management service can generate a session mesh policy based on the first and second session mesh reports. The session mesh policy can be applied to the session mesh devices.

In some embodiments, the present invention may be implemented as a method for managing a session mesh. One or more session mesh reports, which identify session mesh devices of a session mesh for a session, can be received. One or more security requirements applicable to the session can be identified. Based on the one or more session mesh reports and the one or more security requirements, a security mesh policy, which defines configurations for the session mesh devices to cause the session mesh to comply with the one or more security requirements, can be generated. The session mesh policy can be distributed to one or more client computing devices that are session mesh devices to thereby cause the one or more client computing devices to apply the configurations to the session mesh devices.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "client computing device" should be construed as encompassing any computing device that an individual may personally use such as a desktop, laptop, tablet, smart phone, etc. The term "device" should be distinguished from "client computing device" in that a device may be used by a client computing device to provide some type of input or output functionality. The term "workspace" should be construed as an environment that includes a client computing device and one or more devices to which the client computing device is connected. The term "session" should be construed as encompassing a meeting or other type of collaboration that a user may perform using a client computing device.

The term "session mesh" will be used to represent the collection of one or more client computing devices and the devices of any such client computing device's workspace that participate in or are present during a session. For example, when a user of client computing device 110 initiates a Zoom meeting while client computing device is part of workspace 100, the session mesh may include client computing device 110 and each of devices 111-120. Similarly, if a user of a second client computing device enters a room where the user of client computing device 110 is located, the second client computing device and any device of its workspace may become part of the session mesh. Also, if a user of a third client computing device joined the meeting from a remote location, the third client computing device and any device of its workspace may become part of the session mesh. In short, a session mesh can include each client computing device and device that is or could be involved in a session.

Figure 2:
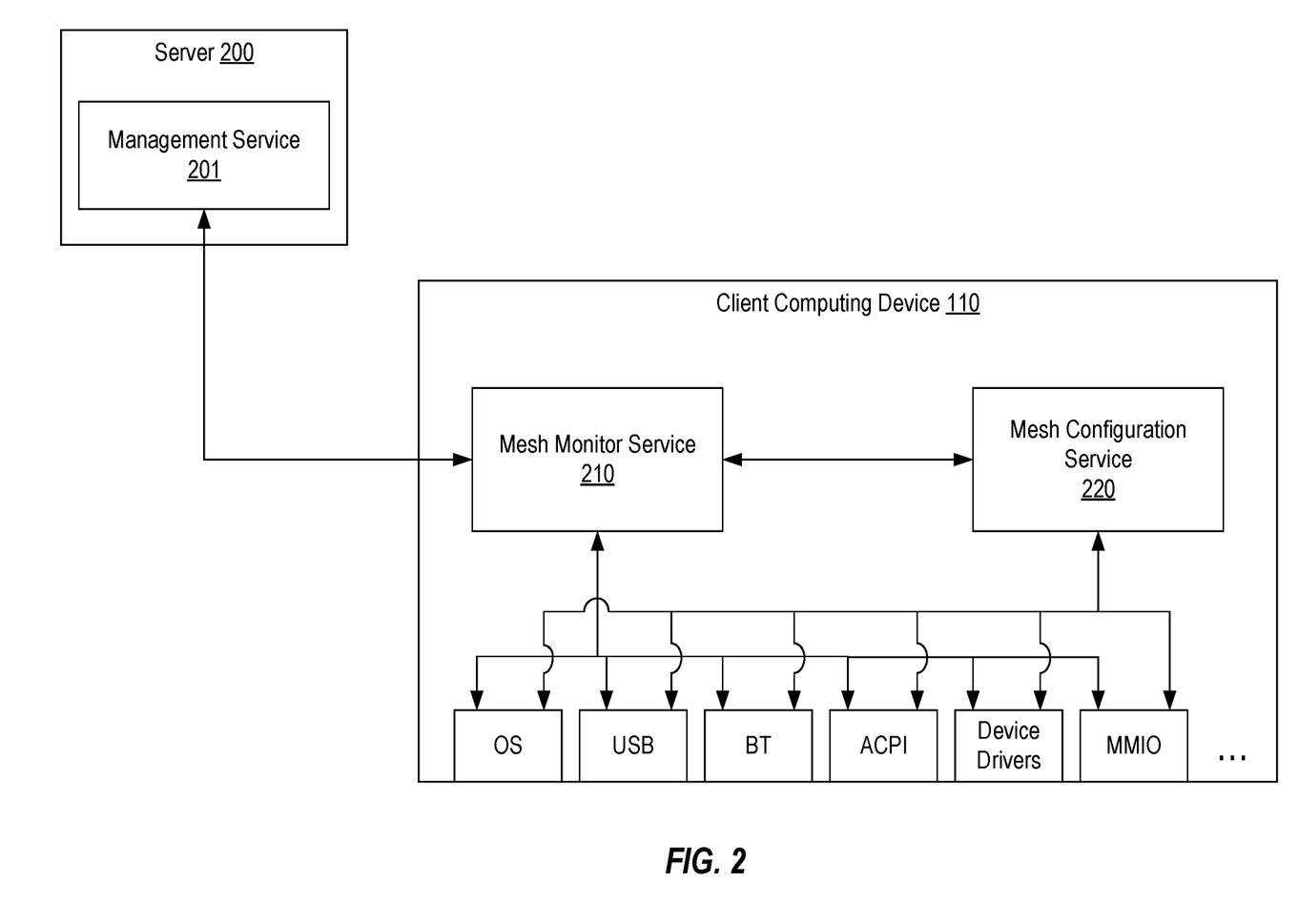
FIG. 2 provides an example of various component that may be employed in one or more embodiments of the present invention.

FIG. 2 provides an example of various components that may be employed when embodiments of the present invention are implemented. As shown, a mesh monitor service 210 and a mesh configuration service 220 can be employed on each client computing device 110 that may participate in embodiments of the present invention. Although mesh monitor service 210 and mesh configuration service 220 are depicted as separate components, they could be implemented in any suitable way. Therefore, mesh monitor service 210 and mesh configuration service 220 should be construed based on the functionality that they perform as opposed to any particular structuring of the component(s) that perform the functionality.

A management service 201 may also be employed on a server 200. Server 200 may represent any computing device with which client computing device 110 may communicate. Accordingly, FIG. 2 represents a scenario where embodiments of the present invention are implemented in a client/server architecture. Management service 201 (or its functionality described herein) may alternatively be implemented on client computing device 110 to create a peer-to-peer architecture. Accordingly, embodiments of the present invention should not be limited to any particular networking architecture or technique.

Mesh monitor service 210 can generally be configured to detect and identify devices and other client computing devices that are part of a session mesh (or "session mesh devices") and to send a "session mesh report" to management service 201. As represented by the arrows in FIG. 2, mesh monitor service 210 can use a variety of techniques to detect and identify session mesh devices such as interfacing with the operating system of client computing device 110, enumerating USB devices, discovering Bluetooth devices, enumerating ACPI namespaces, interfacing with device drivers, performing MMIO device discovery or any other available technique.

Management service 201 can generally be configured to receive a session mesh report from mesh monitor service 210 on any client computing device 110 that may be part of the session mesh. Management service 201 can evaluate each received session mesh report and generate a session mesh policy that can then be shared with mesh configuration service 220 (e.g., via mesh monitor service 210).

Mesh configuration service 220 can generally be configured to adjust the configuration of session mesh devices in accordance with the session mesh policy. As represented by the arrows in FIG. 2, mesh configuration service 220 can use a variety of techniques to configure session mesh devices.

FIGS. 3A-3I provide an example of how a session mesh can be managed in accordance with one or more embodiments of the present invention. For this example, it is assumed that a first user is in a meeting room with his client computing device 110a and that the meeting room includes a webcam 301 and large format display 302 to which client computing device 110a is connected. In other words, a workspace consisting of client computing device 110a, webcam 301 and larger format display 302 may exist. It is also assumed that a second user is also in the meeting room with her client computing device 110b. It is further assumed that both client computing devices 110a and 110b have internal displays, microphones and webcams. This is merely one example environment used for illustrative purposes and should not be considered as limiting the present invention. For example, there could be a single client computing device or more than two client computing devices in the meeting room and zero or more devices. Also, any devices could be connected to any client computing devices that may be present.

Figure 3A:
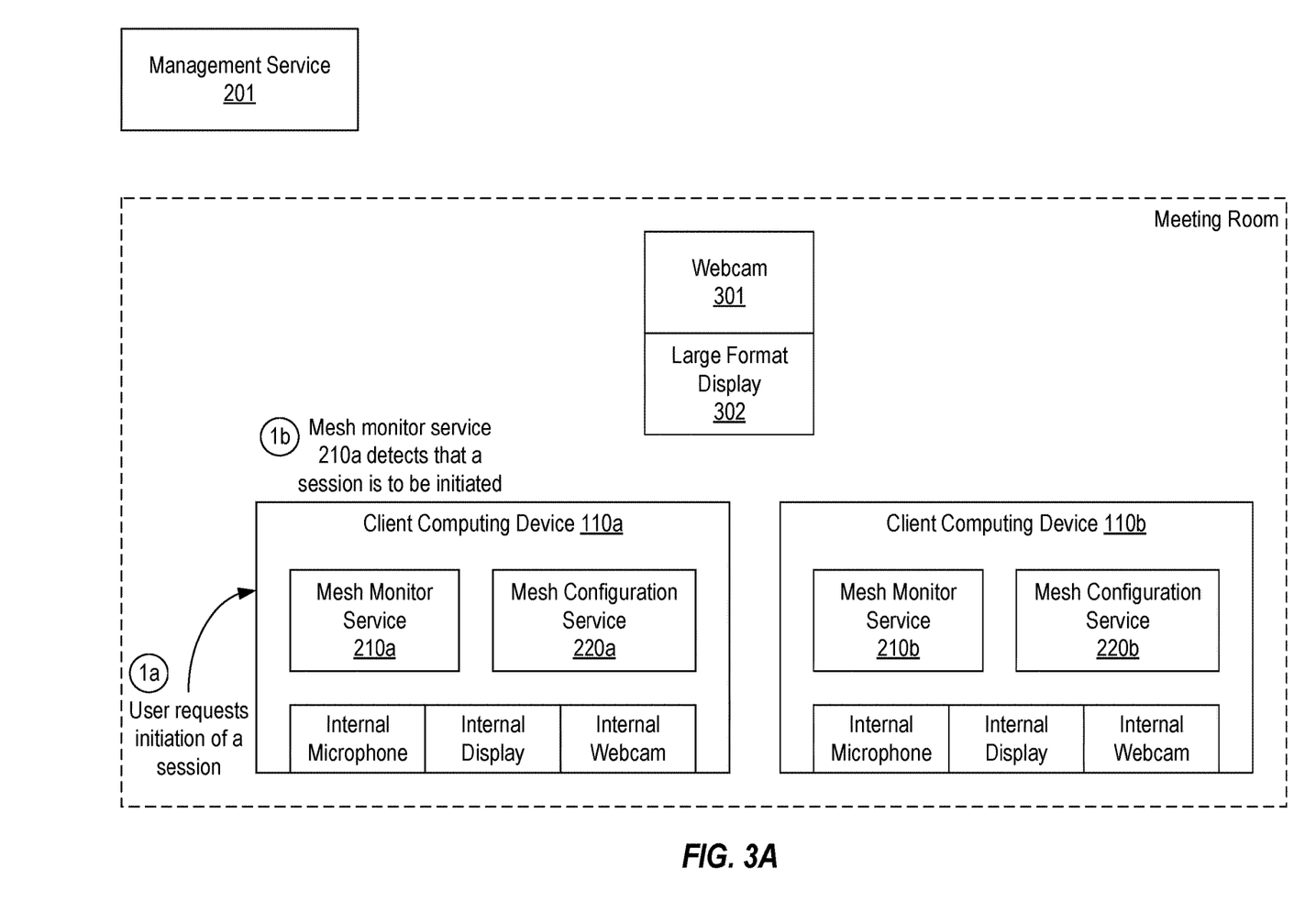
FIGS. 3A-3I provide an example of how a session mesh may be managed in accordance with one or more embodiments of the present invention.

Turning to FIG. 3A, in step 1a, it is assumed that the first user interacts with client computing device 110a to request the initiation of a session. For example, the first user could request that a Zoom meeting be started on client computing device 110a. In step 1b, mesh monitor service 210a on client computing device 110a can detect the user's request to initiate the session. Mesh monitor service 210a could do so in any suitable way. For example, mesh monitor service 210a could be registered to receive notifications whenever a session is initiated via a component on client computing device 110a. As another example, mesh monitor service 210a could detect when an input or output device (e.g., a microphone or webcam) is activated and determine whether a process that activated the input or output device is a component that creates sessions (e.g., zoom.exe).

Figure 3B:
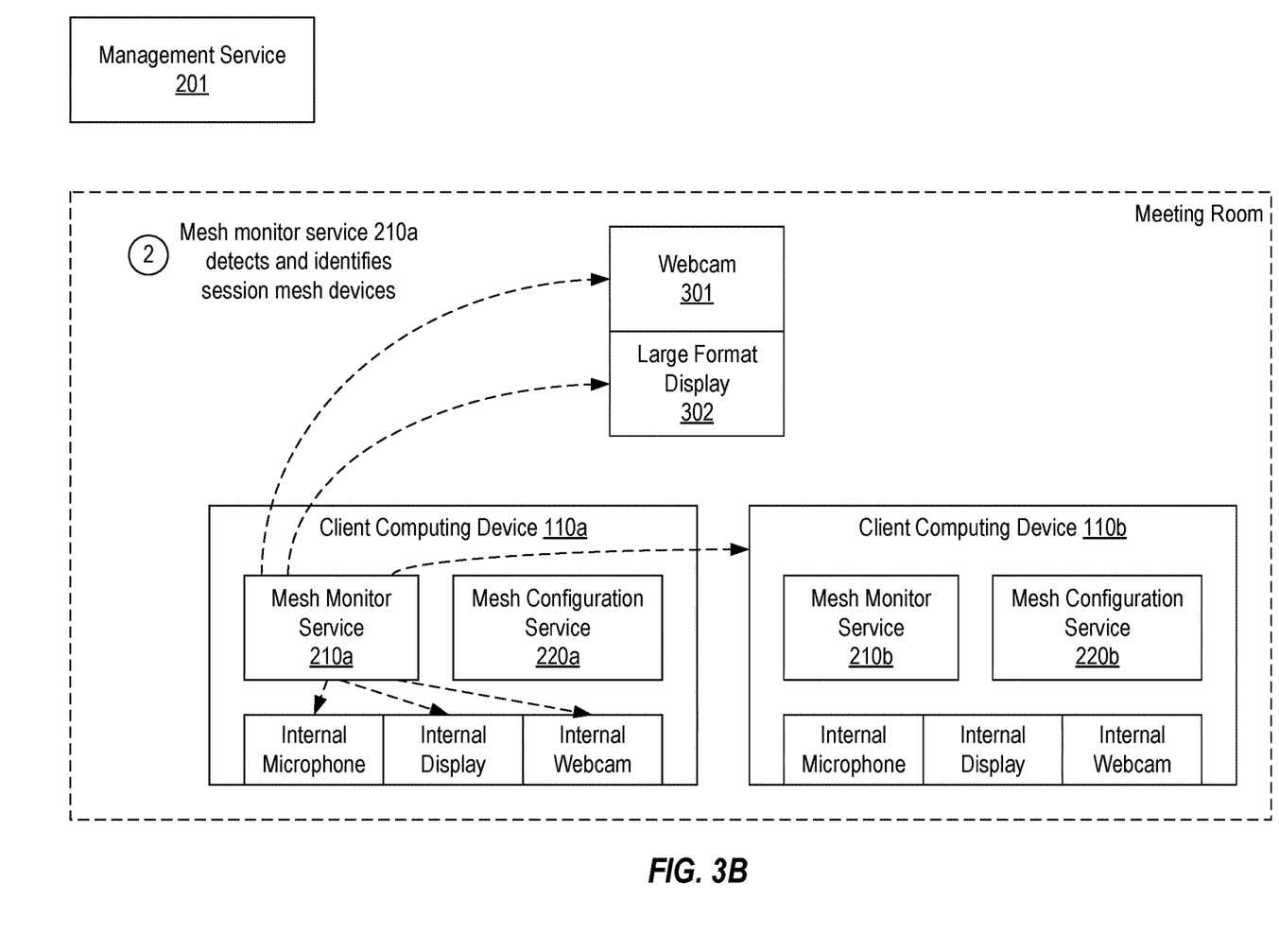

Turning to FIG. 3B, regardless of how it may detect that a session is to be initiated, in step 2, mesh monitor service 210a may detect and identify each session mesh device, or in other words, each device and client computing device that is connected or that may be accessible to client computing device 110a during the session. In this example, mesh monitor service 210a may detect and identify the internal microphone, display and webcam of client computing device 110a, webcam 301, large format display 302 and client computing device 110b as session mesh devices. As stated above, mesh monitor service 210a could use any suitable technique to detect and identify these session mesh devices. As part of identifying a session mesh device, mesh monitor service 210a may obtain an identifier of the session mesh device (or at least of the type of the session mesh device) and/or may identify capabilities (e.g., input and/or output capabilities) of the session mesh device.

Figure 3C:
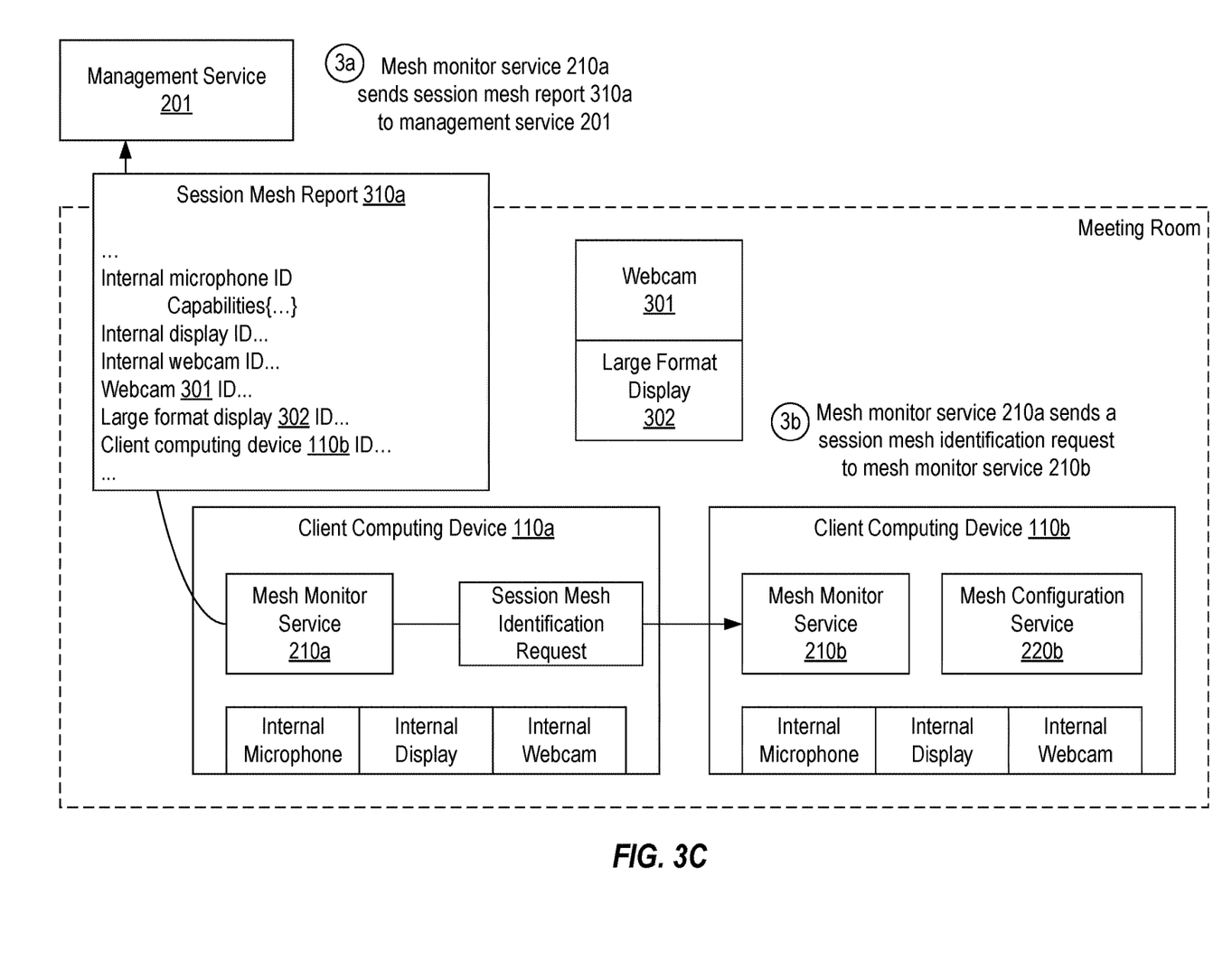

Turning to FIG. 3C, in step 3a and in conjunction with detecting and identifying each session mesh device, mesh monitor service 210a may create and send a session mesh report 310a to management service 201. Session mesh report 310a can notify management service 201 that a session is to be initiated on client computing device 110a and can identify each session mesh device and/or the capabilities of each session mesh device for the session. Although not shown, in some embodiments, session mesh report 310a can also provide information about the session such as the type of session (e.g., a video conference or phone call), the participants, etc. Also, session mesh report 310a can identify the first user or otherwise enable management service 201 to identify the first user.

In step 3b, mesh monitor service 210a can send a session mesh identification request to mesh monitor service 210b (or to the mesh monitor service running on any client computing device that was identified as a session mesh device). The session mesh identification request can instruct mesh monitor service 210b to perform a similar process of detecting and identifying any session mesh devices. Notably, there may be session mesh devices that are not detectable by mesh monitor service 210a. By sending a session mesh identification request to other instances of mesh monitor service 210 running on client computing devices that were detected to be part of the session mesh, mesh monitor service 210 can facilitate the detection and identification of all session mesh devices.

Figure 3D:
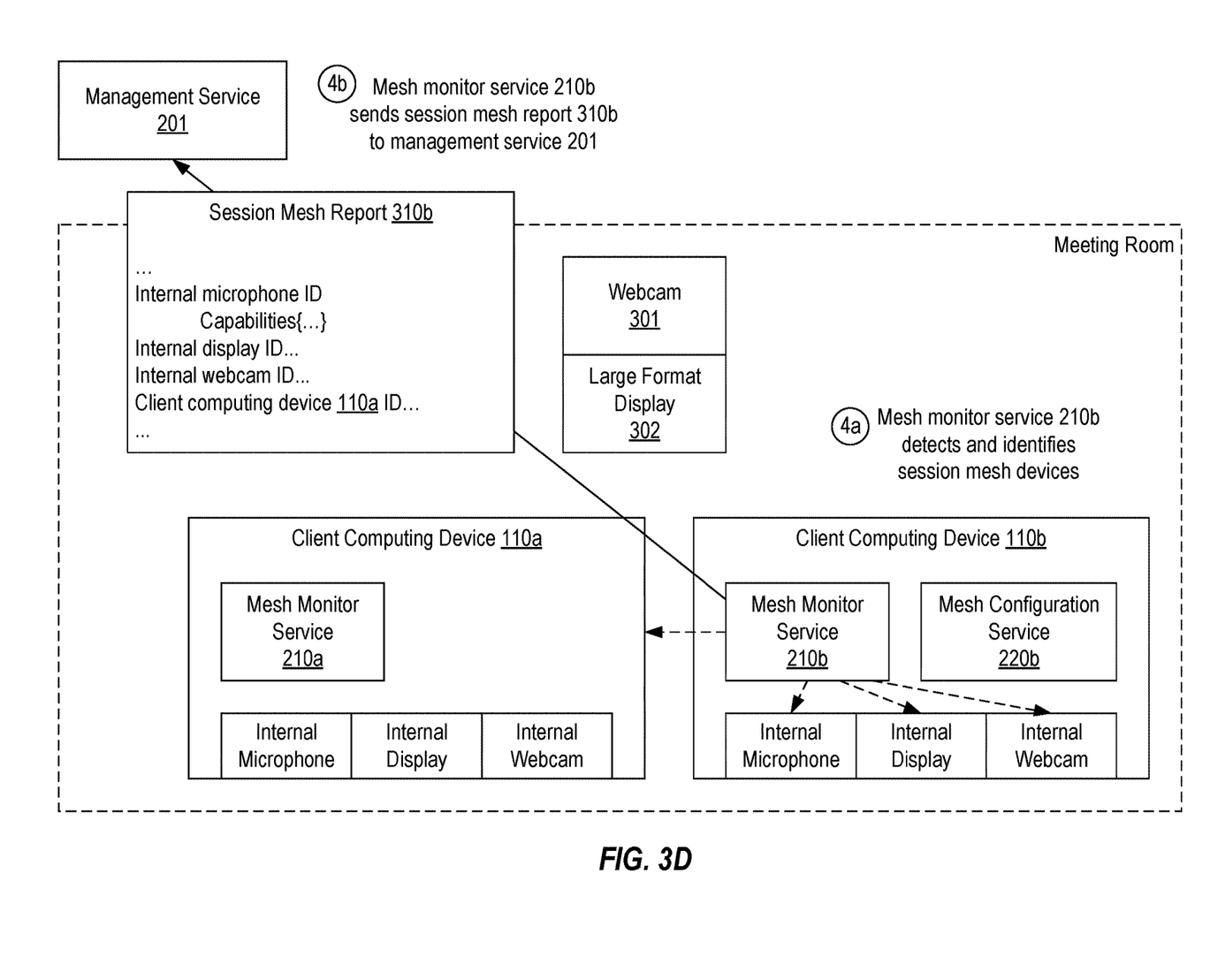

Turning to FIG. 3D, in step 4a, mesh monitor service 210b can detect and identify session mesh devices. In this example, it is assumed that mesh monitor service 210b can only detect and identify its internal microphone, display and webcam and client computing device 110a. For example, webcam 301 and large format display 302 may not be discoverable to client computing device 110b. In step 4b, mesh monitor service 210b can create and send session mesh report 310b to management service 201. Session mesh report 310b can be similar to session mesh report 310a except that it will identify session mesh devices detected and identified by mesh monitor service 210b. Notably, because session mesh report 310a identified client computing device 110b, management service 201 can know that it should receive session mesh report 310b from mesh monitor service 210b on client computing device 110b. In other words, management service 201 can use the identifications of client computing devices in session mesh reports to determine whether it has received a session mesh report from each client computing device that is part of the session mesh. In this way, management service 201 can know when it has become aware of all session mesh devices and can therefore proceed to create a policy for configuring the session mesh in accordance with any security or other requirements.

Figure 3E:
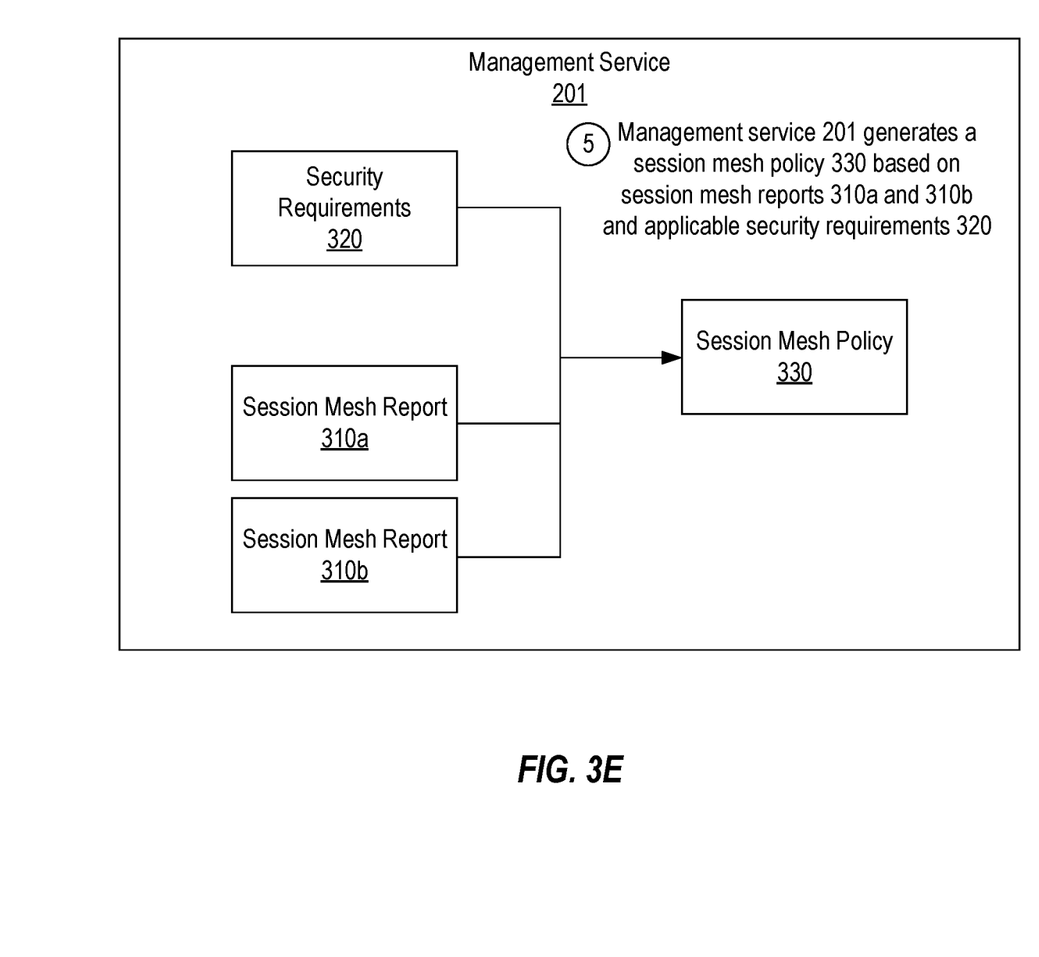

Turning to FIG. 3E, once management service 201 has determined that it has received a session mesh report from each client computing device that is a session mesh device, which in this example includes client computing devices 110a and 110b, in step 5, management service 201 can generate a session mesh policy 330 based on session mesh reports 310a and 310b and applicable security requirements 320. For example, management service 201 may evaluate session mesh reports 310a and 310b to identify any defined security level for the session (e.g., whether and/or to what extent the session may be confidential, private or otherwise restricted to certain individuals, groups of individuals, roles of individuals, etc.), which individuals are participating in the session or otherwise present (e.g., which individuals are the users of client computing devices 110a and 110b), the session mesh devices and/or their capabilities, etc.

Management service 201 may also evaluate security requirements 320 to determine how session mesh devices should be configured to comply with such requirements. For example, for a session assigned a particular security level, security requirements 320 could define that one or more external displays (e.g., large format display 302 which may be mounted on the wall where it could be seen by passersby) should be disabled during the session. As another example, for a session assigned a particular security level, security requirements 320 could define that all cameras in the session mesh should be disabled during the session. As a further example, for a session assigned a particular security level, security requirements 320 could define that visual content should only be displayed on secure mesh devices when only individuals with a particular role are present. In short, a wide variety of security requirements 320 and rules for applying such requirements could be defined and used.

Management service 201 can create session mesh policy 330 to define configurations for session mesh devices to ensure that the session mesh complies with the applicable security requirements 320. For example, session mesh policy 330 could include each session mesh device that is identified in session mesh reports 310a and 310b and could specify configuration settings for their respective capabilities (or at least those having configuration settings that should be modified).

Figure 3F:
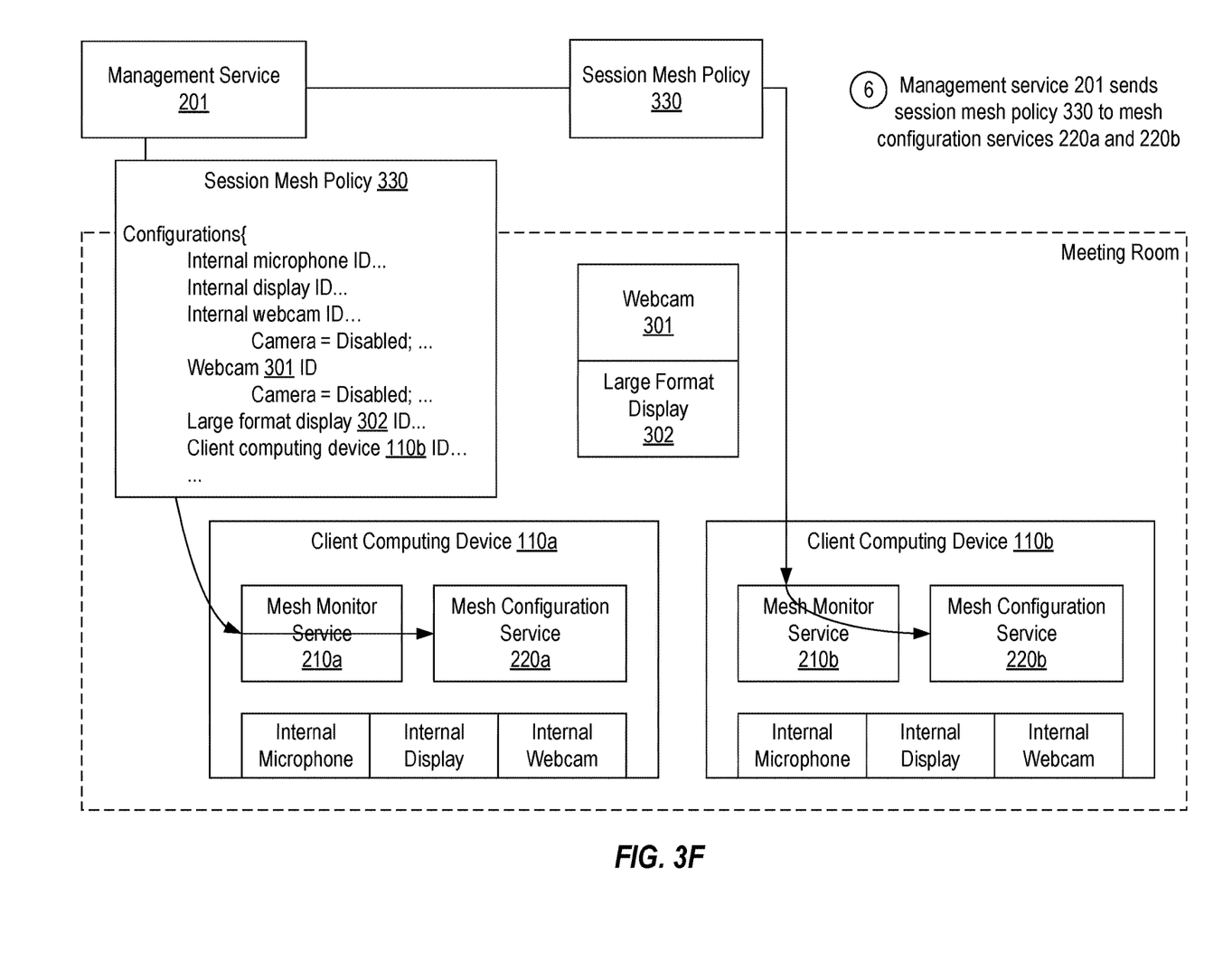

Turning to FIG. 3F, in step 6, management service 201 can send session mesh policy 330 to mesh configuration services 220a and 220b (e.g., via mesh monitor services 210a and 210b respectively). In the depicted example, it is assumed that management service 201 has determined that, due to a security level of the session, no visual content of the session should be captured, and therefore, session mesh policy 330 defines a disabled configuration for each camera.

In some embodiments, the same session mesh policy 330 could be sent to mesh configuration service 220 on each client computing device 110 that is part of the session mesh. In other embodiments, the version of session mesh policy 330 sent to each mesh configuration service 220 may be specific to the client computing device 110 on which it is running. For example, the version of session mesh policy 330 sent to mesh configuration service 220a may provide configurations for session mesh devices that were identified in session mesh report 310a and the version of session mesh policy 330 sent to mesh configuration service 220b may provide configurations for session mesh devices that were identified in session mesh report 310b. In any case, management service 201 can provide session mesh policy 330 to the client computing devices in the session mesh as appropriate to ensure that any configurations defined for the session mesh devices can be applied.

Figure 3G:
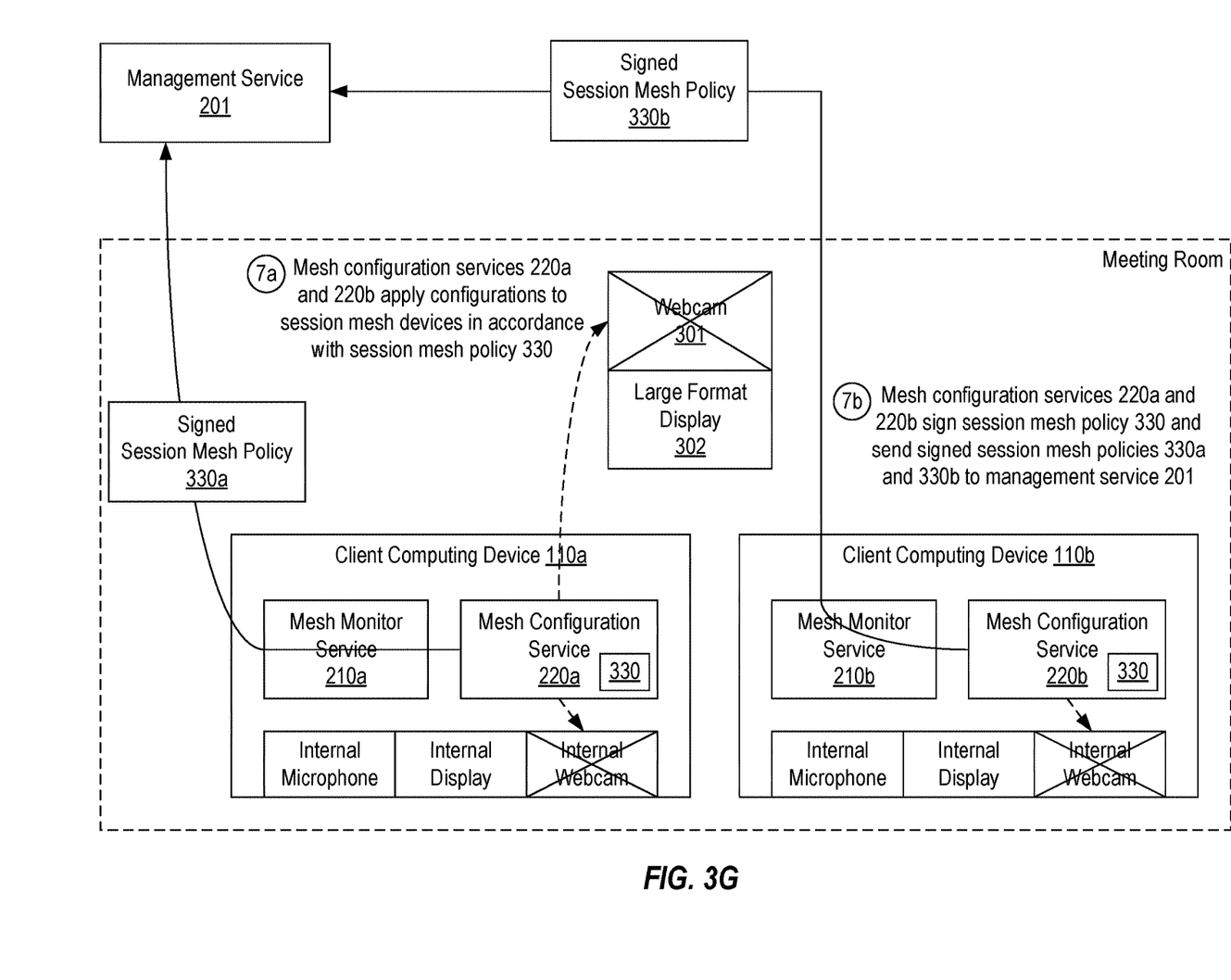

Turning to FIG. 3G, in step 7a, mesh configuration services 220a and 220b can apply the configurations defined in session mesh policy 330 to the respective session mesh devices to cause the session mesh to comply with session mesh policy 330. For example, mesh configuration service 220*a* may employ suitable techniques to disable the internal webcam (or camera) of client computing device 110*a* and to disable webcam 301 (or its camera). Likewise, mesh configuration service 220*b* may employ suitable techniques to disable the internal webcam (or camera) of client computing device 110*b*. Upon applying the appropriate configurations defined in session mesh policy 330, in step 7*b*, mesh configuration services 220*a* and 220*b* may each sign session mesh policy 330 (e.g., using a signing key specific to client computing devices 110*a* and 110*b* respectively) and send a signed session mesh policy 330*a* and 330*b* respectively to management service 201 (e.g., via mesh monitor services 210*a* and 210*b* respectively). Accordingly, management service 201 may receive a signed session mesh policy directly from each client computing device 110 that is part of the session mesh.

Figure 3H:
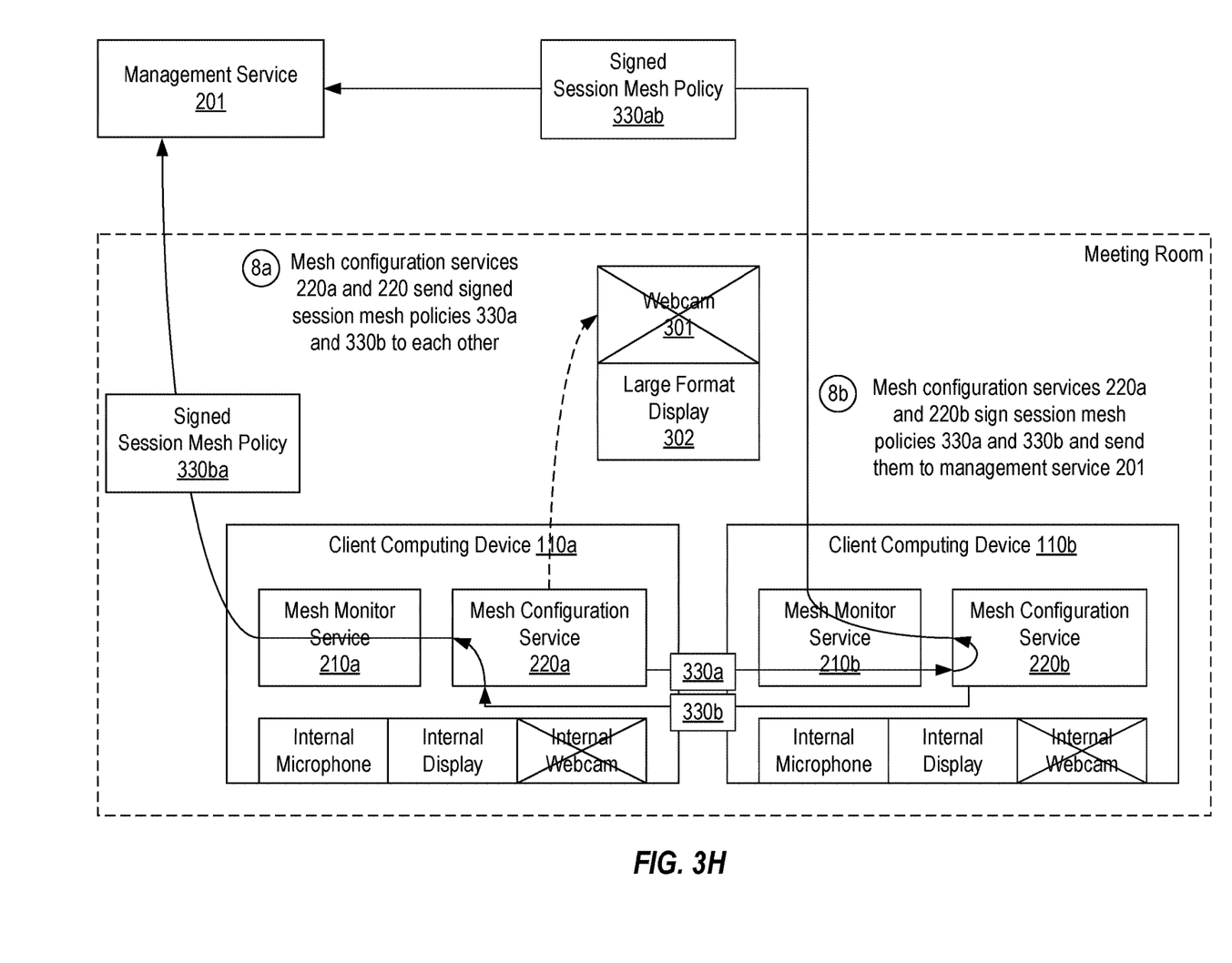

Turning to FIG. 3H, in addition to directly sending signed session mesh policies 330*a* and 330*b* to management service 201, in step 8*a*, mesh configuration services 220*a* and 220*b* can also send signed session mesh policies 330*a* and 330*b* to each other. Then, in step 8*b*, mesh configuration services 220*a* and 220*b* can sign signed session mesh policies 330*b* and 330*a* respectively (e.g., using the same signing key they each used to sign session mesh policy 330) and send signed session mesh policies 330*ba* and 330*ab* respectively to management service 201. For clarity, signed session mesh policy 330*ba* is session mesh policy 330 that was first signed by mesh configuration service 220*b* and then again signed by mesh configuration service 220*a*, whereas, signed session mesh policy 330*ab* is session mesh policy 330 that was first signed by mesh configuration service 220*a* and then again signed by mesh configuration service 220*b*. Accordingly, management service 201 may receive, from each client computing device in the session mesh, a session mesh policy that has been signed by more than one client computing device in the session mesh. Therefore, in the current example, management service 201 may receive four total signed session mesh policies. In scenarios where there may be more than two client computing devices in the session mesh, mesh configuration service 220 could be configured to ensure that each client computing device signs session mesh policy 330 as part of steps 8*a* and 8*b* (e.g., signing session mesh policy 330 three times when three client computing devices are present). Alternatively, mesh configuration service 220 could be configured to ensure that each session mesh policy 330 is signed by two separate client computing devices even when there may be more than two client computing devices in the session mesh.

Figure 3I:
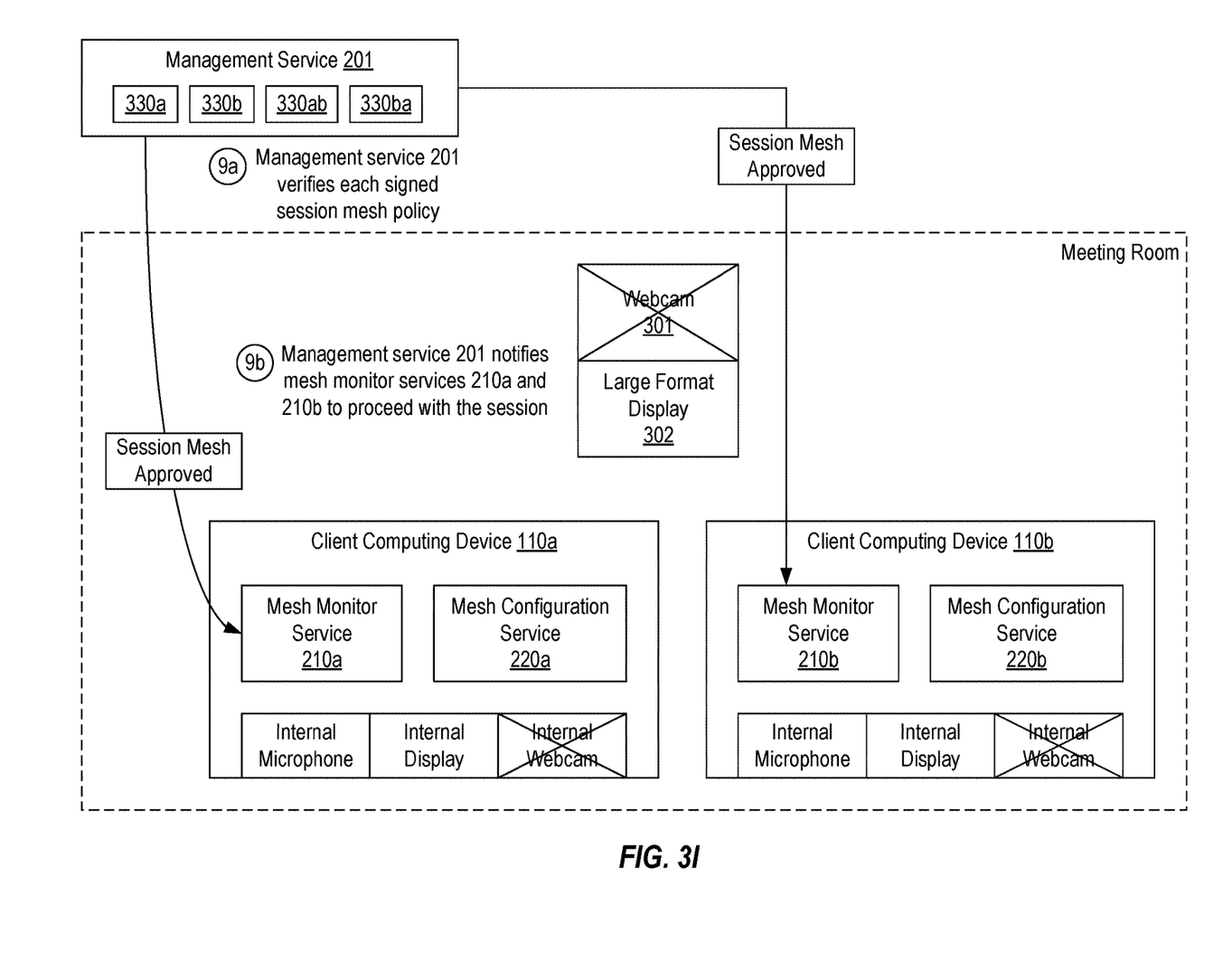

Turning to FIG. 3I, upon determining that it has received each signed session mesh policy, which in this example includes signed session mesh policies 330*a*, 330*b*, 330*ab* and 330*ba*, in step 9*a*, management service 201 can verify the signed session mesh policies (e.g., to confirm their integrity and the validity/authenticity of the signature(s)). In this way, management service 201 can confirm that the configurations defined in session mesh policy 330 were received at each client computing device in the session mesh and applied appropriately to the session mesh devices. Upon verifying each signed session mesh policy, in step 9*b*, management service 201 can notify mesh monitor services 210*a* and 210*b* that the configuration of the session mesh is approved (i.e., that it complies with the applicable security requirements) and that the session may be commenced. For example, in response to this notification, mesh monitor service 210*a* (and possibly mesh monitor service 210*b*) can allow a Zoom meeting to commence.

At this point, and possibly throughout the depicted process, mesh monitor services 210*a* and 210*b* can monitor the session mesh to detect if and when changes occur. For example, if a third user walked into the meeting room with his or her client computing device or joined the session from a remote location, mesh monitor service 210*a* could detect the client computing device, send a new or updated session mesh report to management service 201 (step 3*a*) and a session mesh identification request to mesh monitor service 210*b* and mesh monitor service 210 on the added client computing device (step 3*b*). The process could then proceed as described above to ensure that the configurations of the session mesh devices will be modified, if necessary, based on the addition of the client computing device to the session mesh (e.g., to restrict output if the new user is not authorized). A similar process could be performed if the second user were to leave the meeting room with client computing device 110*b* (e.g., to enable output if the presence of the second user was the reason for restricting the output). Likewise, if a new device were detected in the session mesh or if a device were removed from the session mesh, the process could be performed to make any appropriate modifications to the configurations of the session mesh devices (e.g., to disable a newly added/connected webcam, display, microphone, etc.). The above-described process could also be performed in response to a session being terminated. For example, if configurations are applied during a session, the termination of the session could trigger the above-described process to cause the configurations of the session mesh devices to be automatically returned to defaults.

In summary, embodiments of the present invention enable a session mesh to be automatically and seamlessly configured for, during and/or after a session to comply with any applicable security requirements or other policy. In this way, a user's workspace experience can be enhanced.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing a session mesh comprising:
    detecting that a session is to be initiated in a specified room, the session including a first client computing device that is detected as being in the specified room;
    identifying, by the first client computing device, a first set of session mesh devices of a session mesh, the first set of session mesh devices comprising the first client computing device and other devices that are detected as being in the specified room including one or more devices of a workspace of the first client computing device and a second client computing device, the session mesh comprising a collection of the session mesh devices during the session;
    sending, by the first client computing device, a first session mesh report to a management service, the first session mesh report identifying the first set of session mesh devices;
    identifying, by the second client computing device, a second set of session mesh devices of the session mesh, the second set of session mesh devices comprising the second client computing device and other devices that are detected as being in the specified room including one or more devices of a workspace of the second client computing device and the first client computing device;
    sending, by the second client computing device, a second session mesh report to the management service, the second session mesh report identifying the second set of session mesh devices;
    in response to receiving the first and second session mesh reports, generating, by the management service, a session mesh policy that defines configurations for the session mesh devices to ensure that the session mesh complies with security requirements; and
    applying the configurations defined in the session mesh policy to the session mesh devices to thereby cause the session mesh to comply with the security requirements during the session.

2. The method of claim 1, further comprising:
    initiating the session after the configurations defined in the session mesh policy are applied to the session mesh devices.

3. The method of claim 1, wherein the first client computing device detects that the session is to be initiated.

4. The method of claim 1, further comprising:
    sending, by the first client computing device, a session mesh identification request to the second client computing device;
    wherein the second client computing device sends the second mesh report in response to receiving the session mesh identification request.

5. The method of claim 1, wherein each of the first and second client computing devices apply at least one of the configurations defined in the session mesh policy to at least one of the session mesh devices.

6. The method of claim 5, further comprising:
    signing, by each of the first and second client computing devices, the session mesh policy to thereby create respective first and second signed session mesh policies; and
    sending, by the first and second client computing devices, the respective first and second signed session mesh policies to the management service.

7. The method of claim 6, further comprising:
    sending, by the first client computing device, the first signed session mesh policy to the second client computing device; and
    sending, by the second client computing device, the second signed session mesh policy to the first client computing device.

8. The method of claim 7, further comprising:
    signing, by the first client computing device, the second signed session mesh policy to thereby create a first twice signed session mesh policy;
    signing, by the second client computing device, the first signed session mesh policy to thereby create a second twice signed session mesh policy; and
    sending, by the first and second client computing devices, the respective first and second twice signed session mesh policies to the management service.

9. The method of claim 8, further comprising:
    verifying, by the management service, the first and second signed session mesh policies and the first and second twice signed session mesh policies; and
    initiating the session after the verification.

10. The method of claim 1, further comprising:
    identifying a change in the session mesh devices;
    updating the session mesh policy to define configurations for the changed session mesh devices; and
    applying the configurations defined in the updated session mesh policy to the changed session mesh devices.

11. A method for managing a session mesh comprising:
    identifying, by a first client computing device that is in a specified room and before, during or after a session, a first set of session mesh devices of a session mesh, the first set of session mesh devices including the first client computing device and other devices that are detected as being in the specified room including one or more devices of a workspace of the first client computing device and a second client computing device, the session mesh comprising a collection of the session mesh devices during the session;
    sending, by the first client computing device and to a management service, a first session mesh report that identifies the first set of session mesh devices;

sending, by the first client computing device, a session mesh identification request to the second client computing device;

identifying, by the second client computing device and in response to the session mesh identification request, a second set of session mesh devices of the session mesh, the second set of session mesh devices comprising the second client computing device and other devices that are detected as being in the specified room including one or more devices of a workspace of the second client computing device and the first client computing device;

sending, by the second client computing device and to the management service, a second session mesh report that identifies the second set of session mesh devices;

generating, by the management service, a session mesh policy based on the first and second session mesh reports; and applying the session mesh policy to the session mesh devices.

12. The method of claim 11, wherein the session mesh policy defines configurations for at least one of the session mesh devices to enforce one or more security requirements applicable to the session.

13. The method of claim 11, wherein the second set of session mesh devices includes one or more session mesh devices that are not included in the first set of session mesh devices.

14. The method of claim 11, further comprising:

signing, by each of the first and second client computing devices, the session mesh policy to thereby create respective first and second signed session mesh policies;

sending, by the first and second client computing devices, the respective first and second signed session mesh policies to the management service;

sending, by the first client computing device, the first signed session mesh policy to the second client computing device;

sending, by the second client computing device, the second signed session mesh policy to the first client computing device;

signing, by the first client computing device, the second signed session mesh policy to thereby create a first twice signed session mesh policy;

signing, by the second client computing device, the first signed session mesh policy to thereby create a second twice signed session mesh policy; and sending, by the first and second client computing devices, the respective first and second twice signed session mesh policies to the management service.

15. The method of claim 14, further comprising:

initiating or maintaining the session in response to verifying the first and second signed session mesh policies and the first and second twice signed session mesh policies.

16. One or more computer storage media storing computer executable instructions which when executed implement a method for managing a session mesh comprising:

identifying, by a first client computing device and before, during or after a session, a first set of session mesh devices of a session mesh, the first set of session mesh devices including the first client computing device, one or more devices of a workspace of the first client computing device, and a second client computing device, the session mesh comprising a collection of the session mesh devices during the session;

sending, by the first client computing device and to a management service, a first session mesh report that identifies the first set of session mesh devices;

sending, by the first client computing device, a session mesh identification request to the second client computing device;

identifying, by the second client computing and in response to the session mesh identification request, a second set of session mesh devices of the session mesh;

sending, by the second client computing device and to the management service, a second session mesh report that identifies the second set of session mesh devices;

generating, by the management service, a session mesh policy based on the first and second session mesh reports;

applying the session mesh policy to the session mesh devices;

signing, by each of the first and second client computing devices, the session mesh policy to thereby create respective first and second signed session mesh policies;

sending, by the first and second client computing devices, the respective first and second signed session mesh policies to the management service;

sending, by the first client computing device, the first signed session mesh policy to the second client computing device;

sending, by the second client computing device, the second signed session mesh policy to the first client computing device;

signing, by the first client computing device, the second signed session mesh policy to thereby create a first twice signed session mesh policy;

signing, by the second client computing device, the first signed session mesh policy to thereby create a second twice signed session mesh policy; and sending, by the first and second client computing devices, the respective first and second twice signed session mesh policies to the management service.

17. The computer storage media of claim 16, wherein the method further comprises:

initiating the session after the configurations defined in the session mesh policy are applied to the session mesh devices.

18. The computer storage media of claim 16, wherein the first client computing device identifies the first set of session mesh devices of the session mesh before the session.

19. The computer storage media of claim 16, wherein the method further comprises:

verifying, by the management service, the first and second signed session mesh policies and the first and second twice signed session mesh policies; and initiating the session after the verification.

20. The computer storage media of claim 16, wherein the first client computing device identifies the first set of session mesh devices by interfacing with an operating system, enumerating USB devices, discovering Bluetooth devices, enumerating ACPI namespaces, interfacing with device drivers, or performing MMIO device discovery.

* * * * *